US010917334B1

(12) United States Patent
Lamanna et al.

(10) Patent No.: US 10,917,334 B1
(45) Date of Patent: Feb. 9, 2021

(54) NETWORK ROUTE EXPANSION

(71) Applicant: Amazon Technologies, Inc., Seattle, WA (US)

(72) Inventors: James Michael Lamanna, Round Hill, VA (US); Andrew Hemstreet Redmon, Fairfax, VA (US); David Gonzales, Annandale, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/712,647

(22) Filed: Sep. 22, 2017

(51) Int. Cl.
*H04L 12/707* (2013.01)
*H04L 12/751* (2013.01)
*H04L 12/723* (2013.01)
*H04L 12/717* (2013.01)

(52) U.S. Cl.
CPC .............. *H04L 45/24* (2013.01); *H04L 45/02* (2013.01); *H04L 45/50* (2013.01); *H04L 45/22* (2013.01); *H04L 45/42* (2013.01)

(58) Field of Classification Search
None
See application file for complete search history.

(56) References Cited

U.S. PATENT DOCUMENTS

| 7,301,911 | B2* | 11/2007 | Mack-Crane | H04J 3/14 370/254 |
| 7,362,709 | B1* | 4/2008 | Hui | H04L 45/00 370/221 |
| 7,450,505 | B2* | 11/2008 | Buchanan | H04L 12/4641 370/231 |
| 7,568,047 | B1* | 7/2009 | Aysan | H04L 45/02 370/352 |
| 7,778,235 | B2* | 8/2010 | Thubert | H04L 45/025 370/328 |
| 7,782,854 | B2* | 8/2010 | Sakata | H04L 12/4641 370/392 |
| 7,796,619 | B1* | 9/2010 | Feldmann | H04L 41/22 370/229 |
| 7,821,946 | B2* | 10/2010 | Mack-Crane | H04J 3/14 370/238 |
| 7,876,713 | B2* | 1/2011 | Doherty | H04L 45/00 370/256 |

(Continued)

*Primary Examiner* — Gregory B Sefcheck
(74) *Attorney, Agent, or Firm* — Klarquist Sparkman, LLP

(57) ABSTRACT

Technologies are provided for expanding computer network route advertisements. A route expansion server can be configured to receive route advertisements from a router, generate an expanded route advertisement that includes additional network route information, and transmit the expanded route advertisement to another router. The route expansion server can receive a route advertisement from a network zone edge router, comprising a network address prefix. The route expansion server can look up one or more additional network address prefixes associated with the edge router and generate an expanded route advertisement message that indicates that the edge router is a potential next hop for the network address prefix and the one or more additional network address prefixes. The route expansion server can transmit the expanded route advertisement message to another router. In at least some embodiments, the route expansion server can generate different expanded route advertisement messages for different routers.

20 Claims, 9 Drawing Sheets

(56) References Cited

U.S. PATENT DOCUMENTS

| | | | | |
|---|---|---|---|---|
| 7,904,571 B1* | 3/2011 | Kalmanek, Jr. | ..... | H04L 41/0823 709/229 |
| 8,125,891 B2* | 2/2012 | Mack-Crane | ............. | H04J 3/14 370/216 |
| 8,184,526 B2* | 5/2012 | Duncan | ............... | H04L 43/0811 370/216 |
| 8,441,919 B2* | 5/2013 | Vasseur | ................... | H04L 12/66 370/216 |
| 8,576,721 B1* | 11/2013 | Peterson | ................. | H04L 45/00 370/238 |
| 8,667,084 B2* | 3/2014 | Vasseur | ................... | H04L 45/28 709/217 |
| 8,700,801 B2* | 4/2014 | Medved | ................... | H04L 45/02 709/242 |
| 8,750,163 B2* | 6/2014 | Awano | .................... | H04L 45/34 370/254 |
| 8,842,577 B2* | 9/2014 | Sajassi | .................... | H04L 45/66 370/255 |
| 9,130,875 B2* | 9/2015 | Mack-Crane | ............. | H04J 3/14 |
| 9,131,288 B2* | 9/2015 | Fu | ........................ | H04J 3/1652 |
| 9,225,597 B2* | 12/2015 | Tubaltsev | ............... | H04L 45/02 |
| 9,391,876 B2* | 7/2016 | Chunduri | ................ | H04L 45/22 |
| 9,413,847 B2* | 8/2016 | Medved | ................... | H04L 45/02 |
| 9,590,844 B1* | 3/2017 | Esale | ................... | H04L 41/0668 |
| 9,590,845 B1* | 3/2017 | Esale | ...................... | H04L 45/28 |
| 9,590,901 B2* | 3/2017 | Tubaltsev | ............. | H04L 45/586 |
| 9,647,926 B2* | 5/2017 | Chunduri | ................ | H04L 45/12 |
| 9,699,116 B2* | 7/2017 | Zhang | ..................... | H04L 49/35 |
| 9,900,249 B2* | 2/2018 | Awano | .................... | H04L 45/34 |
| 9,979,629 B2* | 5/2018 | Sivabalan | ............. | H04L 45/021 |
| 10,095,535 B2* | 10/2018 | Dubey | ................ | G06F 9/45558 |
| 10,097,372 B2* | 10/2018 | Bhattacharya | ........ | H04L 45/745 |
| 10,164,881 B2* | 12/2018 | Tubaltsev | ............. | H04L 49/354 |
| 10,567,283 B2* | 2/2020 | Tubaltsev | ............. | H04L 45/74 |
| 2006/0013127 A1* | 1/2006 | Izaiku | .................... | H04L 45/28 370/225 |
| 2006/0029032 A1* | 2/2006 | Allan | ..................... | H04L 12/4679 370/351 |
| 2015/0109954 A1* | 4/2015 | Wilkinson | .............. | H04L 41/12 370/254 |
| 2016/0057010 A1* | 2/2016 | Lopez Morillo | ... | H04L 41/0816 398/49 |
| 2017/0310589 A1* | 10/2017 | Tambakuwala | ........ | H04L 45/023 |
| 2018/0351882 A1* | 12/2018 | Jeganathan | ............. | H04L 49/70 |
| 2018/0359176 A1* | 12/2018 | Nainar | .................... | H04L 45/22 |

\* cited by examiner

FIG. 6

EXAMPLE ROUTE EXPANSION TABLE 600

| ZONE ROUTER | SUBNET ID | NON-ZONE PEER | EXPANSION SET |
|---|---|---|---|
| router-z1 | 10.0.0.0/8 | router-nz1 | 10.0.1.0/24<br>10.0.2.0/24 |
| router-z2 | 10.0.0.0/8 | router-nz1 | 10.0.3.0/24<br>10.0.4.0/24 |
| router-z3 | 10.0.0.0/8 | router-nz1 | 10.0.5.0/24 |
| ... | | | |

NETWORK ROUTE EXPANSION

BACKGROUND

Network routers can be used to forward data packets from a source computing device to a destination computing device in a computer network. In larger networks, a data packet may be routed through multiple routers before reaching its ultimate destination. When one router transmits a data packet to a neighboring router in the network, the transfer can be referred to as a "hop." When a router receives a data packet and identifies a neighboring router to which the data packet should be transmitted, it can be said to have identified a "next hop" for the data packet. At least some routers are configured to determine next hops for data packets using routing tables. A routing table can be used to determine associations between network address prefixes and next hops to which data packets matching the network address prefixes should be routed. Network routing protocols exist that enable routers to build routing tables and converge on a shared network topology. Example routing protocols include the Border Gateway Protocol (BGP), the Open Shortest Path First protocol (OSPF), and the Intermediate System to Intermediate System protocol (IS-IS).

Previous strategies for converging on a shared network topology include transmitting route advertisements between routers in a fully meshed network, or using a route reflector to reflect route advertisements sent from one router to all other routers connected to the route reflector. In some protocols (such as BGP) each router maintains a routing information base (RIB) where the router stores all received route information in an on-board memory. The router may then use the information in the RIB to generate a routing table that contains a set of selected next hops for various network address prefixes.

BRIEF DESCRIPTION OF THE DRAWINGS

FIG. 6 depicts an example route expansion table.

DETAILED DESCRIPTION

Figure 1:
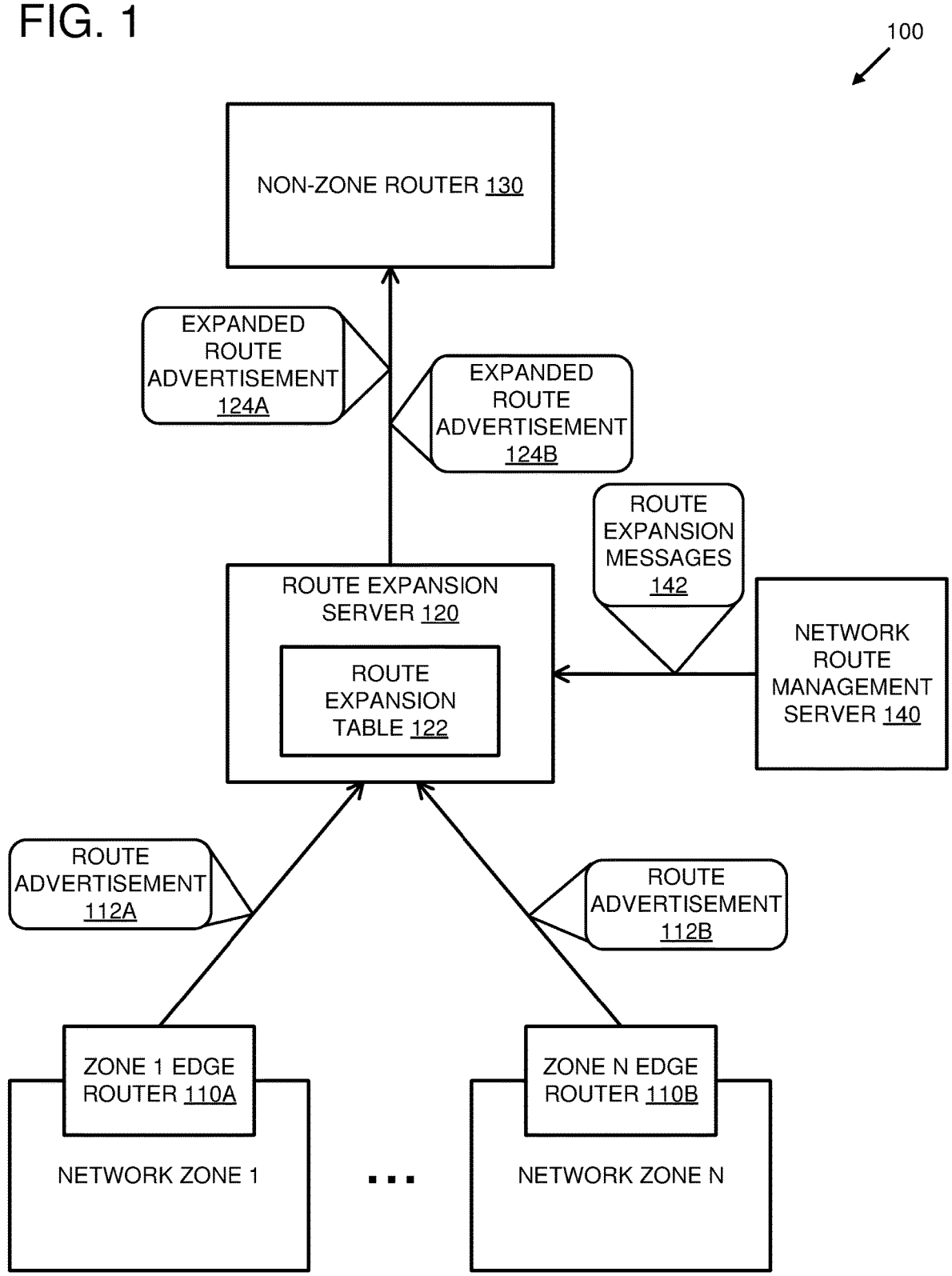
FIG. 1 is a system diagram depicting an example system configured to generate expanded route advertisement messages using a route expansion table.

In at least some network configurations where routers are fully meshed, or organized as peers for a route reflector, network routes that are advertised by one router may be propagated (or reflected in the case of a route reflector) to all the other connected routers. The routers, in some cases, store the route information received from the other routers in on-board memory (for example as part of a RIB, a forwarding information base (FIB), etc.). In scenarios where a sufficiently large number of routers are involved, the volume of routing information can exceed available router memory. In such scenarios, the router memory size can effectively constrain a number of routes that can be advertised in the network. For example, in a configuration where some of the routers are edge routers for separate network zones, a number of routes that can be advertised for each zone may be effectively constrained by router memory size, since all advertised routes may be stored by all the connected routers.

At least some of the embodiments of the technologies described herein address these problems by dynamically expanding routes into larger sets of routes and/or different sets of routes when the routes are re-advertised. For example, a route expansion server can be connected to multiple routers. The route expansion server can be configured to receive a route advertisement from one router, generate an expanded route advertisement that includes one or more additional routes, and transmit the expanded route advertisement to another router. In at least some embodiments, the route expansion server can be configured to generate different expanded route advertisements for different routers. Additionally or alternatively, the route expansion server can be configured to suppress re-advertisements of routes to certain connected routers. For example, the route expansion server can be configured to receive a route advertisement from a network zone edge router, to generate an expanded route advertisement, and to transmit the expanded route advertisement to a non-zone router but not to another network zone edge router.

In at least one embodiment, a route expansion server is connected to one or more network zone edge routers and one or more routers external to the one or more network zones. The route expansion server can be configured to receive a route advertisement message from one of the network zone edge routers, wherein the route expansion message comprises a network address prefix and an identifier for the network zone edge router. The route expansion server can be configured to look up a set of one or more additional network address prefixes associated with the identifier for the network zone edge router and to generate an expanded route advertisement message, wherein the expanded route advertisement message indicates that the network zone edge router is a potential next hop for the network address prefix and the one or more additional network address prefixes. The route expansion server can then transmit the expanded route advertisement message to one or more of the routers external to the one or more network zones. In at least some embodiments, the route expansion server generates different expanded route advertisement messages for different routers, wherein the different expanded route advertisement messages comprise different additional network address prefixes.

Thus, in at least some cases, an amount of route information that a router in a network is required to store in memory can be reduced. Additionally, in at least some cases, since the amount of route information is reduced, the time required to generate a routing table may be reduced as well.

FIG. 1 is a system diagram depicting an example system 100 configured to generate expanded route advertisement messages 124 using a route expansion table 122.

The example system 100 comprises a route expansion server 120 connected to a computer network. The route expansion server 120 is configured to receive a route advertisement message 112 via the computer network. For example, the route advertisement message 112 can be received from a network zone edge router 110 that is connected to the route expansion server via the computer network. In at least some embodiments, the route advertisement message 112 can comprise an identifier for the network zone edge router 110 and a network address prefix. The route advertisement message 112 can indicate that the network zone edge router 110 can be a potential next hop for network transmissions associated with network addresses that begin with the network address prefix.

The router expansion server 120 can be configured to generate an expanded route advertisement message 124 based on the received route advertisement message 112. The expanded route advertisement message 124 can identify the network zone edge router 110 as a potential next hop for one or more network address prefixes that are not included in the route advertisement message 112 that is received from the network zone edge router 110. The route expansion server 120 can use one or more data items included in the route advertisement message 112 to look up one or more additional network address prefixes associated with the network zone edge router 110 in the route expansion table 122. For example, the route advertisement message 112 can comprise an identifier for the network zone edge router 110. The route expansion server 120 can be configured to use the identifier for the network zone edge router 110 as all or part of a key to look up the one or more additional network address prefixes in the route expansion table 112. In at least some embodiments, the identifier for the network zone edge router 110 comprises a port identifier associated with a communication port of the route expansion server 122 which the network zone edge router 110 is connected. Additionally or alternatively, the identifier for the network zone edge router 110 can comprise a label associated with the network zone edge router 110. For example, in an embodiment where the computer network is a multi-protocol label switching (MPLS) network, the identifier for the network zone edge router 110 can comprise an MPLS label associated with the network zone edge router 110.

Although the route expansion table 122 is depicted in FIG. 1 as being stored in the route expansion server 120, in at least some embodiments all or part of the route expansion table 122 can be stored in one or more separate storage location(s) that is/are accessible by the route expansion server via one or more physical and/or logical communication connection.

The route expansion server 120 can be configured to receive one or more route expansion messages 142 via the computer network. A route expansion message 142 can comprise an identifier for the network zone edge router 110 and one or more network address prefixes. The route expansion server 120 can be configured to store the one or more network address prefixes in the route expansion table 122 in association with the identified network zone edge router 110. In such an embodiment, responsive to receipt of a route advertisement message 112 from the network zone edge router 110, the route expansion server 120 can be configured to retrieve the one or more network address prefixes from the route expansion table 122 and to generate an expanded route advertisement 124 that identifies the network zone edge router 110 as a next hop for a network address prefix contained in the route advertisement message and the one or more network address prefixes retrieved from the route expansion table 122.

In a particular embodiment, the route expansion server 120 can comprise a border gateway protocol (BGP) route reflector that is modified to generate and transmit the expanded route advertisement 124 based on one or more entries in the route expansion table 122. Typical BGP route reflectors reflect received route advertisement messages to all other routers connected to the route reflector, and reflect received route advertisement messages without modifying them. A route expansion server 120 can be configured to expand received route advertisement messages and, in at least some cases, can be configured to transmit the expanded route advertisement messages to a non-zone router 130, and not to any other connected network zone edge routers 110.

In at least some embodiments, a network address prefix retrieved from the route expansion table 122 can identify a network address block that is a subnet of a network address block that is identified by the network address prefix received as part of the route advertisement 112. For example, in a scenario where the route advertisement 112 identified a network address prefix of "10.0.0.0/8," and a network address prefix of "10.0.1.0/24" is retrieved from the route expansion table, the network address prefix "10.0.1.0/24" can be considered to identify a network address block (10.0.1.X) that is a subnet of the address block identified by the network address prefix "10.0.0.0/8" (10.X.X.X).

Although Classless Inter-Domain Routing (CIDR) notation is used to represent network address prefixes, subnets, and/or subdomains in at least some of the examples described herein, this is not intended to be limiting. Other representations (such as bit masks, etc.) can be used to represent prefixes, subnets, and/or subdomains.

In at least some embodiments, the one or more route expansion messages 142 are generated by a network route management server 140 that is connected to the route expansion server via the computer network and/or a separate computer network. In a particular embodiment, the network route management server 140 can receive commands to change network address prefix associations with network zones via a network management plane. The network route management server 140 can be configured to transmit the one or more route expansion messages 142 to the route expansion server 120 to update the network address prefix associations in real time. Additionally or alternatively, transmission of the updates can be scheduled for a specified date and/or time.

The route expansion server 120 can be configured to transmit an expanded route advertisement message 124 to a non-zone router 130 via the computer network. The non-zone router 130 can be an aggregation router configured to route network traffic to one or more network zone edge routers. The non-zone router 130 can be configured to receive the expanded route advertisement 124 and to update a routing information database based on the information contained in the expanded route advertisement 124. Although one non-zone router 130 is depicted in FIG. 1, in at least some embodiments the route expansion server 120 is connected to multiple non-zone routers and is configured to transmit one or more expanded route advertisement messages 124 to more than one of the multiple non-zone routers.

In at least some embodiments, the route expansion server 120 can be configured to receive route advertisement messages 112A-B from multiple network zone edge routers 110A-B associated with separate network zones. The route expansion server 120 can be configured to generate multiple expanded route advertisement messages 124A-B that identify the multiple network zone edge routers 110A-B as potential next hops for different network address prefixes. The route expansion server 120 can be configured to transmit the multiple expanded route advertisement messages 124A-B to the non-zone router 130.

For example, the route expansion server 120 can receive a network route advertisement message 112A from a first network zone edge router 110A, wherein the network route advertisement message 112A identifies the network zone edge router 110A as a next hop for a first network address prefix. The route expansion server 120 can retrieve a second network address prefix from the route expansion table 122 that is associated with the network zone edge router 110A. The route expansion server 120 can then generate an expanded network route advertisement message 124A that identifies the network zone edge router 110A as a next hop for the first network address prefix and the second network address prefix. The route expansion server can transmit the expanded route advertisement message 124A to the non-zone router 130.

The route expansion server 120 can receive another network route advertisement message 112B from a second network zone edge router 110B, wherein the network route advertisement message 112B identifies the network zone edge router 110B as a next hop for the first network address prefix. The route expansion server 120 can retrieve a third network address prefix from the route expansion table 122 that is associated with the network zone edge router 110B. The route expansion server 120 can then generate another expanded network route advertisement message 124B that identifies the network zone edge router 110B as a next hop for the first network address prefix and the third network address prefix. The route expansion server can transmit the expanded route advertisement message 124B to the non-zone router 130.

In at least some embodiments, the second network address prefix and the third network address prefix can be associated with different network address blocks that are separate subnets of a network address block associated with the first network address prefix.

In at least some such embodiments, the network route management server 140 can be configured to generate and transmit the one or more route expansion messages 142 to associate the multiple network zone edge routers 110A-B with the different network address prefixes. The route expansion server 120 can receive the one or more route expansion messages 142 and store the different network address prefixes in the route expansion table 122 in association with the multiple network zone edge routers 110A-B.

In any of the examples described herein, a router can be a computing device configured to receive and forward data packets within a computer network and/or between computer networks. In at least some embodiments, a router can be referred to as a switch. The router can be configured to create and maintain a routing table based on routing protocol messages received via one or more computer networks. The router can comprise multiple communication ports connected to other routers (and/or other types of computing devices). The router can be configured to receive data packets from other routers (and/or other computing devices) via one or more of the communication ports. The router can use data contained in the data packets and the routing table to identify next hop routers (and/or other computing devices) for the data packets and to transmit the data packets to the identified next hops via one or more of the communication ports.

In any of the examples described herein, a network zone can be a group of networked computing devices (such as routers) that can be identified as an origin for one or more network address prefixes. As an origin for a network address prefix, a network zone can be regarded by routers in the network as an ultimate destination for data packets destined for network addresses that begin with the network address prefix. Example network address prefixes include IP address prefixes, routing masks, subnet masks, etc. Example network zones include separate availability zones, data centers, subnets, border gateway protocol (BGP) autonomous systems, etc. In practice, any group of networked computing devices that can be identified as a destination for a given network address prefix can be a network zone. One or more computing devices in a network zone can generate routing protocol messages that are transmitted through a computer network and/or between computer networks. The generated routing protocol messages can identify routes through the computer network that can be used by routers in the network to transmit data packets towards computing devices in the network zone.

In any of the examples described herein, a network zone edge router (or edge router) can be a router configured to provide a point of entry for a given network zone. A network zone edge router can be configured to route data packets received from computing devices external to the network zone to computing devices within the network zone. The network zone edge router can also be configured to route data packets received from computing devices internal to the network zone to computing devices external to the network zone. A router that is external to the network zone can be referred to as a non-zone router.

An edge router can be configured to transmit route advertisement messages (such as BGP NLRI UPDATE messages, or the like) to external routers that identify network address prefixes for which the edge router can act as a next hop in the routing of data transmissions. In any of the examples described herein, a route expansion server can be used to receive such route advertisement messages from the edge router, expand the route advertisement messages to include additional network address prefixes, and transmit the expanded route advertisement messages to the external router.

Figure 2:
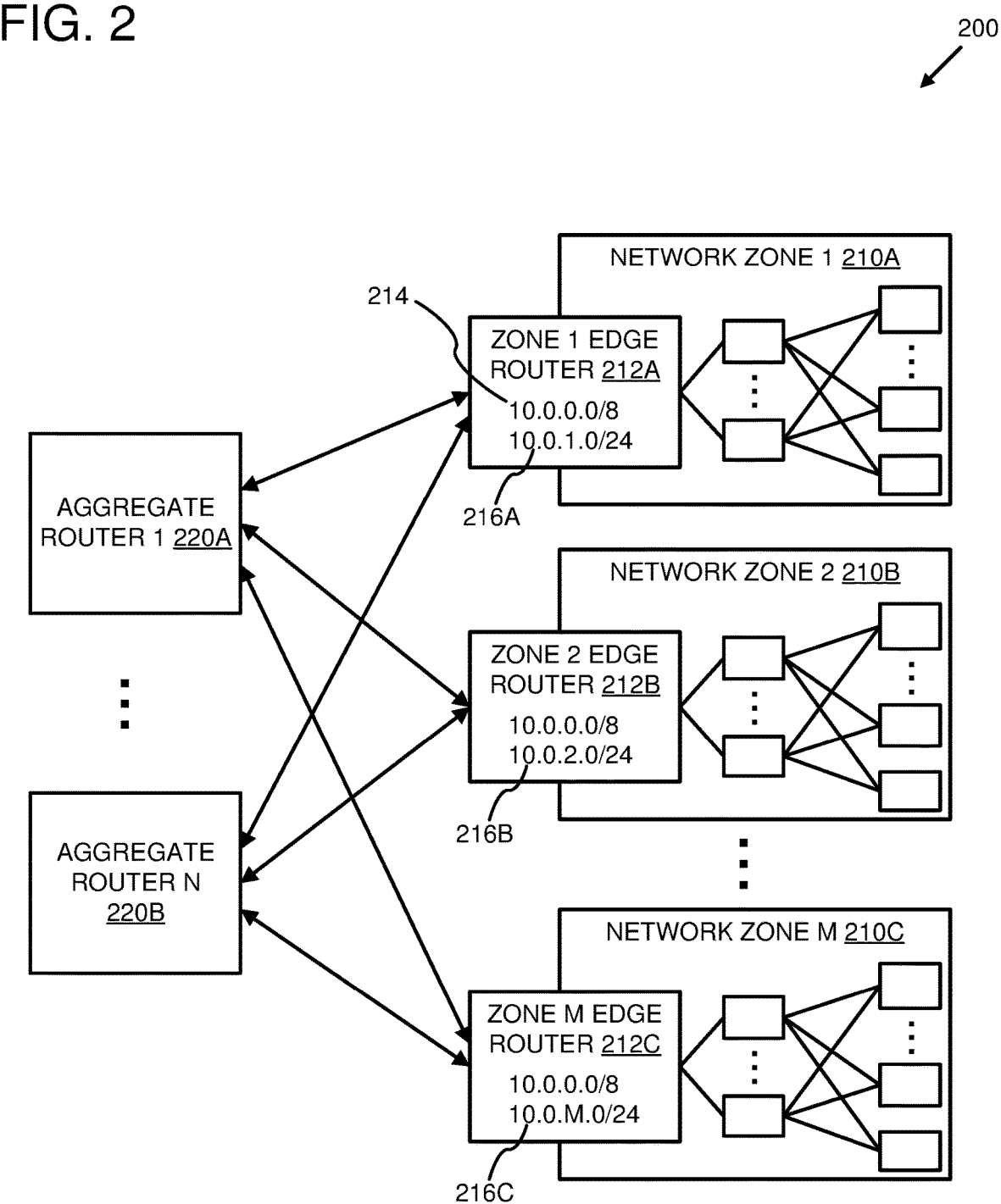
FIG. 2 is a system diagram depicting an example network configuration without a route expansion server.

FIG. 2 is a system diagram depicting an example system 200 without a route expansion server. The example system 200 comprises multiple network zones 210A-C comprising network zone edge routers 212A-C, respectively. The multiple network zone edge routers 212A-C are connected to multiple aggregate routers 220A-B. The aggregate routers 220A-B are external to the network zones 210A-C. In at least some configurations, one or more of the aggregate routers 220A-B serve as entry points for data communications from computing devices outside the network.

In at least some embodiments, the network zone edge routers 212A-C and the aggregate routers 220A-B are configured to transmit route advertisements to one another via a fully-meshed network. Alternatively, the routers 212A-C and 220A-B can be connected as peers to a route advertisement reflector (such as a BGP route reflector) that is configured to reflect route advertisements received from one peer to all other connected peers.

The network zone edge routers 212A-C can be configured to transmit network route advertisements for a same network domain 214, and for different network subdomains 216A-C, respectively. The different network subdomains 216A-C can be associated with one or more computing devices within the separate network zones 210A-C. Although a single common domain 214 and separate subdomain 216 are depicted in FIG. 2 for each of the network zones 210A-C, in at least some scenarios a network zone can be associated with multiple different domains and/or subdomains. In embodiments where a routing protocol such as BGP is used, each of the routers 212 and 220 may be required to receive and store all advertised routes transmitted by the other routers 212 and 220. In at least some cases, the number of different domains and/or subdomains supported by the various network zones 210 can cause the amount of stored advertised route information to exceed available memory and/or storage for one or more of the routers 212 and/or 220.

Figure 3:
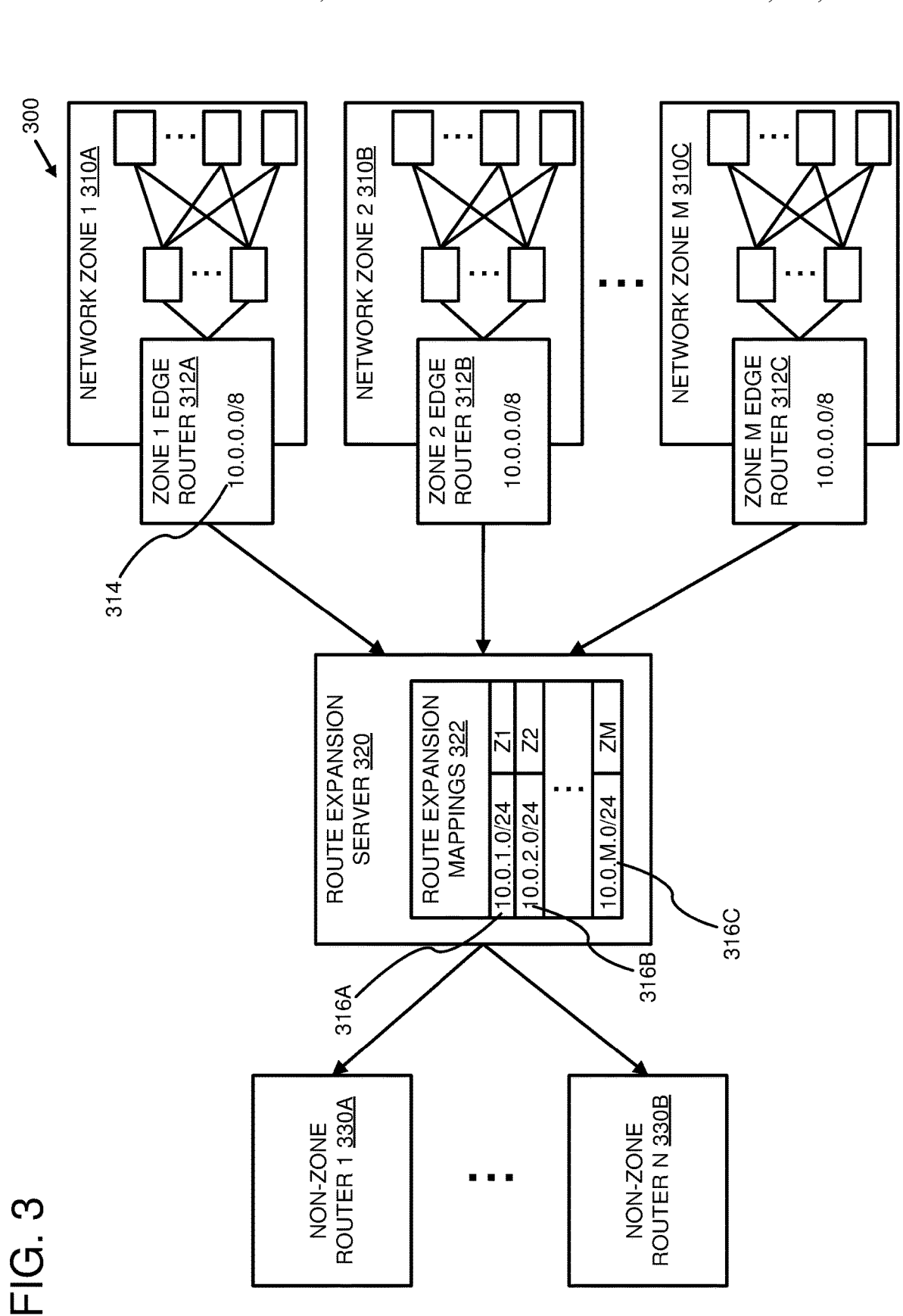
FIG. 3 is a system diagram depicting an example system comprising a route expansion server.

FIG. 3 is a system diagram depicting an example system 300 comprising a route expansion server 320. The example system 300 comprises multiple network zones 310A-C, comprising network zone edge routers 312A-C, respectively. The route expansion server 320 is configured to receive network route advertisements from the network zone edge routers 312A-C and to generate expanded network route advertisements using route expansion mappings 322. The route expansion server 320 is configured to transmit the expanded network route advertisements to one or more other routers 330A-B that are outside of the network zones 310A-C.

By storing route expansion information in the route expansion mappings 322, in some cases the amount of the network route information required to be stored in a memory and/or storage of a network zone edge router 312 can be reduced. For example, the network zone edge router 312A can be configured to transmit route advertisement to the route expansion server 312 comprising a network domain 314. The route expansion server 320 can be configured to retrieve a subdomain 316A from one of the route expansion mappings 322 that is associated with the network zone 310A. The route expansion server 320 can generate an expanded route advertisement comprising the domain 314 and the subdomain 316A and to transmit the generated expanded route advertisement to the one or more routers 330A-B. Thus, an expanded route advertisement can be transmitted router 330 that identifies the network zone edge router 312 A as a potential next hop for the network subdomain 316 A without storing network route information on the network zone edge router 312A associated with the network subdomain 316 A.

The route expansion mappings 322 can comprise multiple mappings that associate different network zone edge routers with different network subdomains. For example, in FIG. 3 the route expansion mappings 322 are depicted as associating the network subdomain 316A with the network zone edge router 312A, associating the network subdomain 316B with the network zone edge router 312B, associating the network subdomain 316C with the network zone edge router 312C, etc. In at least some such embodiments, the route expansion server 320 can be configured to receive a network route advertisement from the network zone edge router 312 B identifying the network zone edge router 312 B is a potential next hop for the network domain 314. The route expansion server 320 can be configured to use the route expansion mapping associating the network zone edge router 312 B with the network subdomain 316 B to generate an expanded network route advertisement identifying the network zone edge router 312 B is a potential next hop for the network domain 314 and the subdomain 316 B. Similarly, upon receipt of a network route advertisement from the network zone edge router 312 C identifying the network zone edge router 312 C as a potential next hop for the network domain 314, the route expansion server 320 can be configured to generate an expanded network route advertisement identifying the network zone edge router 312 C as a potential next hop for the network domain 314 and the subdomain 316 C.

Although the network zone edge routers 312 are depicted in FIG. 3 is being associated with one network domain 314, it is possible for the network zone edge routers 312 to be associated with the multiple network domains, some of which may be the same and/or some of which may be different from one another. Although the route expansion mappings 322 are depicted in FIG. 3 as mapping each of the network zone edge routers 312A-C to a single additional network subdomain 316A-C, respectively, it is possible for one or more of the network zone edge routers 312A-C to be associated with the multiple additional network subdomains. In at least some embodiments where a network zone edge router 312 is associated with multiple network domains, the route expansion mappings 322 can be configured to associate the different network domains with different additional network subdomains. In some such embodiments, the route expansion server 320 can be configured to generate an expanded network route advertisement based on one or more of the mappings that are associated with a network zone edge router 312 from which a network route advertisement is received and that are associated with a network domain that is identified within the network route advertisement that is received.

In a particular embodiment, the network zones 310 comprise separate BGP autonomous systems, for which the respective network zone edge routers 312 are BGP edge routers for the autonomous systems. In such an embodiment, the network route advertisements and expanded network route advertisements can comprise BGP Network Layer Reachability Information (NLRI) updates that identify the network zone edge routers 312 as potential next hops for the network subdomains.

In at least some embodiments, a network route management server (not shown) can be configured to transmit all or part of the route expansion mappings 322 to the route expansion server 320. Such network route management server can be used to dynamically add, edit, and/or delete route expansion mappings from the route expansion server 320. The modified route expansion mappings can be used to generate new expanded network route advertisements when subsequent network route advertisements are received from the network zone edge routers 312A-C. In at least some embodiments, the network route management server can be configured to transmit the modifications to the route expansion mappings via a separate network control plane.

Figure 4:
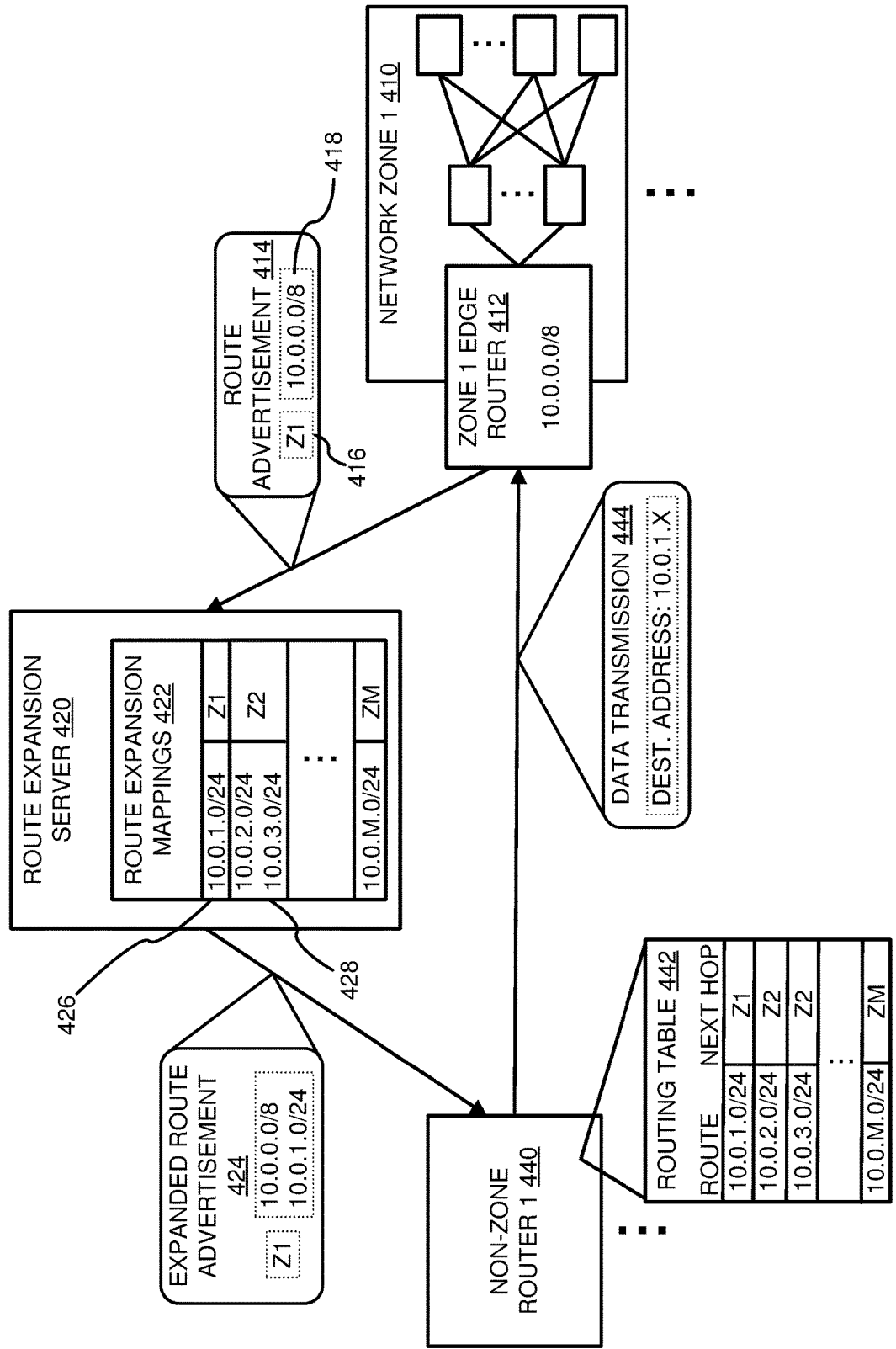
FIG. 4 is a system diagram depicting an example system comprising a zone edge router, a route expansion server, and a non-zone router connected by a computer network.

FIG. 4 is a system diagram depicting an example system 400 comprising a network zone edge router 412, a route expansion server 420, and a non-zone router 440 connected in a computer network. The network zone edge router 412 is configured to act as an edge router for the network zone 410. The network zone edge router 412 is configured to transmit a route advertisement 414 to the route expansion server 420, wherein the route advertisement 414 comprises an identifier 416 for the network zone edge router 412 and a subnet identifier 418. The route advertisement 414 can indicate that the network zone edge router 412 is a potential next hop for data packets destined for network addresses in the subnet identified by the subnet identifier 418.

In at least some embodiments, the identifier 416 can comprise a name for the network zone edge router 412, such as a unique router name by which the network zone edge router 412 can be identified within the computer network. Additionally or alternatively, the identifier 416 can comprise an identifier for a data communication port by which the network zone edge router 412 is connected to the route expansion server 420. Additionally or alternatively, the identifier 416 can comprise a label value associated with the network's own edge router 412. For example, in an embodiment where the computer network is an MPLS network, the identifier 416 can be an MPLS label associated with the network zone edge router 412. Additionally or alternatively, the identifier 416 can comprise an attribute associated with a BGP community on the network route advertised by the network zone edge router 412, an attribute associated with a BGP extended community advertised by the network zone edge router 412, an attribute associated with a route target advertised by the network zone edge router 412, or the like.

The route expansion server 420 can be configured to receive the route advertisement 414 from the network zone edge router 412 and to determine one or more additional subnet identifiers associated with the network zone edge router 412 using the identifier 416 for the network zone edge router 412. The route expansion server 420 can comprise route expansion mappings 422. The determining one or more additional subnet identifiers associated with the network zone edge router 412 can comprise retrieving one or more of the route expansion mappings 422 associated with the identifier 416 for the network zone edge router 412. For example, in FIG. For the route expansion mappings 422 are depicted as comprising route expansion mapping 426 that associates the identifier 416 with an additional subnet identifier. The route expansion server 420 can be configured to use the identifier 416 to locate and retrieve the route expansion mapping 426.

The route expansion server 420 can be configured to generate an expanded route advertisement 424, wherein the expanded route advertisement identifies the network zone edge router 412 is a potential next hop for the subnet identifier 418 and the one or more additional subnet identifiers associated with the network zone edge router 412. For example, the expanded route advertisement 424 is depicted in FIG. For as identifying the network zone edge router 412 as a potential next hop for the subnet identifier 418 and the additional subnet identifier retrieved from the route expansion mapping 426.

The route expansion server 420 can be configured to transmit the expanded route advertisement 424 to a router 440 that is outside of the network zone 410. The router 440 can be configured to receive the expanded route advertisement 424 and update a routing table 442 using the expanded route advertisement 424. For example, the router 440 can be configured to update the routing table 422 to indicate that the network zone edge router 412 is a next hop for data transmissions (e.g., 444) destined for the subnet associated with the subnet identifier retrieved from the route expansion mapping 426. The router 440 can be configured to transmit such data transmissions (e.g., 444) to the network zone edge router 412 via one or more network connections. In at least some embodiments, the route advertisement 414 and the expanded route advertisement 424 can be transmitted via a routing plane and the data transmission 444 can be transmitted via separate data plane by which the router 440 is connected to the network's own edge router 412.

In at least some embodiments, the subnet identifier 418 can be an identifier for an aggregate subnet (i.e., a subnet within which one or more smaller subnets are defined). In such an embodiment, an additional subnet identifier associated with the network zone edge router 412 and the route expansion mappings 422 can be an identifier for a subnet within the aggregate subnet. For example, the subnet identified by the additional subnet identifier in the route expansion mapping 426 can be considered to be a subnet within the subnet identified by the subnet identifier 400 $0.18 the network address space defined by the subnet identifier 418 is a superset of the address space defined by the additional subnet identifier in the route expansion mapping 426.

In at least some embodiments where the subnet identifier 418 is an identifier for an aggregate subnet, other network zone edge routers (not shown) besides the network zone edge router 412 can also be associated with the subnet identifier 418. In such embodiments, the route expansion mappings 422 can associate the different network zone edge routers with identifiers for different subnets within the aggregate subnet. For example, the route expansion mapping 428 associates a second network zone edge router (not shown) with different subnet identifiers in the subnet identifier associated with the network zone edge router 412 and the route expansion mapping 426. The route expansion server 420 can be configured to receive route advertisements (not shown) from the additional network zone edge routers and to generate different expanded route advertisements (not shown) based on the different out expansion mappings associated with the different network zone edge routers. These generated expanded route advertisements can be transmitted to the router 440 and used to update entries in the routing table 442 for the various network zone edge routers.

In at least some embodiments, a network zone edge router can be associated with the multiple additional subnet identifiers. For example, in FIG. For the route expansion mapping 428 is depicted as associating a second network zone edge router (not shown) with two additional subnet identifiers. The route expansion server 420 can be configured to retrieve the multiple subnet identifiers when a route advertisement (not shown) is received from second network zone edge router, and to include the retrieved multiple subnet identifiers in an expanded route advertisement (not shown) that is transmitted to the router 440. In at least some embodiments, the router 440 can be configured to update the routing table 442 using the received expanded route advertisement to indicate that the second network zone edge router is a next hop for data transmissions destined for network address is within either of the identified subnets.

In at least some embodiments, route expansion server 420 is configured to retrieve route expansion mappings that are associated with the identifier 416 for the network zone edge router 412 and that are also associated with subnets within aggregate subnet identified by the subnet identifier 418. For example, the networks zone edge router 412 can be associated with the multiple aggregate subnets. For a given route advertisement received from the network zone edge router 412, the route expansion server 420 can be configured to determine which aggregate subnet is identified by the identifier 418 entered to retrieve one or more of the route expansion mappings 422 that is associated with the identifier 416 for the network zone edge router 412 and there is also associated with the identifier 418 for the aggregate subnet. In this way, the route expansion server 420 can generate different expanded route advertisements 424 for different aggregate subnets with which the network zone is router 412 is associated.

Figure 5:
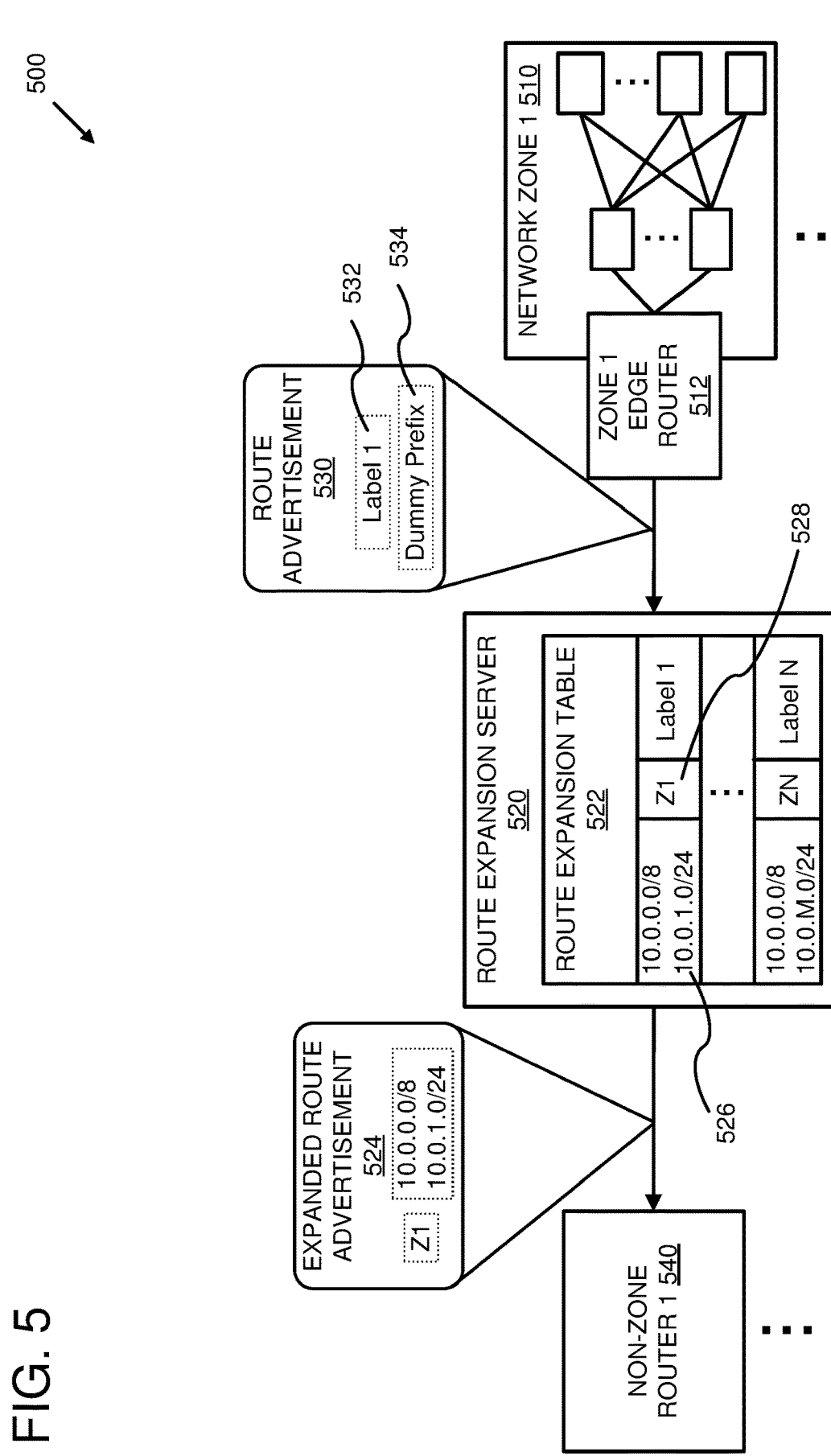
FIG. 5 is a system diagram depicting an example system comprising a route expansion server configured to support fake domain prefixes.

FIG. 5 is a system diagram depicting an example system 500 comprising a route expansion server 520 configured to support fake network domain prefixes (e.g., 534) in route advertisements (e.g., 530). As used herein, the terms "fake network domain prefix" and "dummy network domain prefix" referred to domain address prefixes that are advertised by the network zone edge router (e.g., 512) but that are not associated with any network addresses of the servers and or other computing devices within a network zone (e.g., 510) with which the network zone edge router (e.g., 512) is associated. A value of the fake network domain prefix can be arbitrary, and need not be based on the actual topology of the computer network.

In at least some cases, the fake network domain prefix 534 can be programmed into a routing information base of the network zone edge router 512. For example, the network zone edge router 512 can be configured to advertise that it is a potential next hop for data packets destined for computing devices associated with network addresses that begin with the fake network domain prefix 534, even when no computing devices within the network zone 510 are associated with such network addresses. Although a single victim in prefix 534 is depicted in FIG. 5, in at least some embodiments it is possible for the network zone edge router 512 to advertise routes for more than one fake network domain prefix. In embodiments where the example system 500 comprises multiple network zones associated with multiple separate network zone edge routers, the multiple networks zone edge routers can be configured to advertise network routes for a same fake network domain prefix (e.g., 534).

The network zone edge router 512 can be configured to transmit a route advertisement 530 to the route expansion server 520, indicating that the network zone edge router 512 is associated with a fake network domain prefix 534. The route advertisement 530 can comprise the fake network domain prefix 534 and an associated label 532 (such as an MPLS label or the like). The route expansion server 520 can be configured to receive the route advertisement message 530 and to generate an expanded route advertisement 524 using the label 532. Generating the expanded route advertisement message 524 can comprise replacing the route advertisement associating the network zone edge router 512 with the fake network domain prefix 534 with a new route advertisement associating the network zone edge router 512 with one or more valid network domain prefixes. As used herein, the term "valid network domain prefix" refers to a network domain prefix for which a network zone edge router (e.g., 512) as a potential next hop (i.e., one or more computing devices within the networks zone (e.g., 512) for the network zone edge router are associated with network addresses that began with the valid network domain prefix).

The route expansion server 520 can comprise a route expansion table 522. The route expansion table 522 can associate route advertisement labels with routing advertisement information that can be used to generate expanded route advertisements (e.g., 524). For example, the route expansion table 522 is depicted in FIG. 5 as associating the label 532 with an identifier 528 for the network zone edge router 512 and a route expansion set 526 that comprises two valid network domain prefixes for the network zone edge router 512. The route expansion server 520 can be configured to use the label 532 received as part of the route advertisement 530 as a key to look up the identifier 528 and the route expansion set 526 and the route expansion table 522. The route expansion server 520 can then generate the expanded route advertisement 524, comprising the label 528 for the network zone edge router 512 and the route expansion set 526. The route expansion server 520 can be configured to transmit the generated expanded route advertisement 524 to a router 540 that is outside the network zone 510. The router 540 can be configured to update a routing information base to indicate that the network zone edge router 512 is a potential next hop for one or more of the valid network domain prefixes in the expanded route advertisement message 524. Although one external router 540 is depicted in FIG. 5, it is possible for the route expansion server 520 to transmit the expanded route advertisement message 524 to multiple external routers. Additionally or alternatively, the route expansion server 520 can be configured to receive multiple route advertisement messages from multiple network zone edge routers and to generate multiple, different expanded route advertisement messages using various entries in the route expansion table 522. The multiple, different expanded route advertisement messages can then be transmitted to the external router 540.

In at least some cases, using a fake network domain prefix (e.g., 534) can simplify route advertisement configurations for network zone edge routers (e.g., 512). Since the route advertisement 530 is replaced by the route expansion server 520 using the expanded route advertisement 524, the fake network domain prefix (e.g., 534) is not advertised to external routers in computing devices (e.g., 540). Thus, the use of the fake network domain prefix can be obfuscated from external routers sending network traffic to a network zone (e.g., 510) via a network zone edge router (e.g., 512).

In at least some embodiments, a fake network path identifier other than a fake network domain prefix can be used. For example, the network zone edge router 512 can be configured to transmit a fake network route to the route expansion server 520. The route expansion server 520 can be configured to replace the fake network route with a valid network route.

FIG. 6 depicts an example route expansion table 600 that can be used in any of the examples described herein. The route expansion table 600 can be used by a route expansion server to generate expanded route advertisements. The route expansion table 600 comprises multiple route expansion records (e.g., 602-606). A route expansion record (e.g., 602) can be associated with an identifier for an edge router (e.g., 612) for a network zone. When a route advertisement message is received from a network zone edge router, an identifier for the network zone edge router contained within the route advertisement message can be used to search the route expansion table 600 for a route expansion record that is associated with the identifier for the network zone edge router. For example, a route expansion server can be configured to receive a route advertisement comprising the edge router identifier 612. The route expansion server can use the identifier 612 to locate the route expansion record 602 in the route expansion table 600.

In at least some embodiments, the route expansion records (e.g., 602-606) can be associated with keys comprising edge router identifiers (e.g., 612) and subnet identifiers (e.g., 622). In such an embodiment, searching the route expansion table 600 can comprise using an identifier for an edge router and a subnet identifier (which may be received as part of a network route advertisement message) to locate a route expansion record. For example, a route expansion server can be configured to receive a route advertisement message comprising the network zone edge router identifier 612 and the subnet identifier 622. The route expansion server can search the route expansion table 600 using the edge router identifier 612 and the subnet identifier 622 is a key to locate the route expansion record 602.

A route expansion record can comprise one or more route expansion set entries. For example, the route expansion record 602 is depicted in FIG. 6 as comprising expansion set entries 642 and 643, the route expansion record 604 is depicted as comprising route expansion entries 644 and 646, and the route expansion entry 606 is depicted as comprising a route expansion entry 648. It is also possible for a route expansion record to be associated with more than two route expansion set entries. In at least some embodiments, a route expansion entry can identify one or more subnets of a given subnet associated with a route expansion record. For example, in the route expansion record 602 the expansion set entries 642 and 643 comprise subnet prefixes that identify subnets of the subnet 622.

The route expansion server can be configured to generate an expanded route advertisement message comprising the edge router identifier 612, the subnet identifier 622, and the additional subnet identifiers 642 and 643. The route expansion server can be configured to transmit the generated expanded route advertisement message to a non-zone peer router associated with the identifier 632 in the route expansion record 602. The non-zone peer router can be a router connected to the route expansion server via one or more network communication ports, and that is not in a network zone associated with the edge router 612. In at least some configurations, the non-zone peer router 632 is connected to the edge router 612 via one or more separate network connections. The generated expanded route advertisement message can indicate to the non-peer zone router 632 that the edge router 612 is a potential next hop for the subnet 622, and the additional subnets 642 and 643.

In at least some embodiments, the route expansion table 600 can be used to associate different route expansion sets with different network zone edge routers. For example the network zone edge routers associated with the identifiers 612-616 in the route expansion records 602-608, respectively, can identify edge routers for different network zones. Route advertisement messages received from the different edge routers 612-616 can be expanded using different expansion sets defined in the different route expansion records 602-606.

For example, the route expansion server can be configured to receive a route advertisement message from the edge router associated with the identifier 614, wherein the route advertisement message comprises the edge router identifier 614 and the subnet identifier 622. The route expansion server can search the route expansion table 600 using the edge router identified 614 and the subnet identifier 622 to locate the route expansion record 604. The route expansion server can generate an expanded route advertisement message comprising the edge router identifier 614, the subnet identifier 622, and the subnet identifiers 644 and 646 stored in the route expansion record 604. The route expansion server can transmit the expanded route advertisement message to the non-zone peer router 632.

In another example, the route expansion server can receive a route advertisement message from the network zone edge router associated with the identifier 616, wherein the route advertisement message comprises the edge router identifier 616 and the subnet identifier 622. Using the edge router identifier 616 and the subnet identifier 622, the route expansion server can locate the route expansion record 606 in the route expansion table 600. The route expansion server can generate an expanded route advertisement message comprising the edge router identifier 616, the subnet identifier 622, and the additional subnet identifier 648. The route expansion server can transmit the expanded route advertisement message to the non-zone peer router 632.

Thus, in at least some cases route advertisements received from different network zone edge routers that identify a same subnet can be expanded using different route expansion set entries to associate the different network zone edge routers with different subnets of the same subnet. For example, the route expansion record 602 can be used to generate an expanded route advertisement that identifies the edge router 612 as a potential next hop for the subnets 642 and 643, the route expansion record 604 can be used to generate an expanded route advertisement message that identifies the edge router 614 as a potential next hop for the subnets 644 and 646, and the route expansion record 606 can be used to generate an expanded route advertisement message that identifies the edge router 616 as a potential next hop for the subnet 648.

In at least some embodiments, the route expansion table 600 can comprise multiple route expansion records that associate a given edge router and subnet identifier with different route expansion sets for different non-zone peer routers. For example, the route expansion table 600 can comprise an additional route expansion record (not shown) comprising the edge router identifier 612 and the subnet identifier 622, but that comprises an identifier for a non-zone peer router other than the identifier 632. Such a record can contain one or more route expansion set entries that differ from the route expansion entries 642 and 643 defined in the route expansion record 602. In at least some cases, such a configuration can be used to generate different expanded route advertisement messages that are transmitted to different non-zone peer routers for a given network zone edge router.

Figure 7:
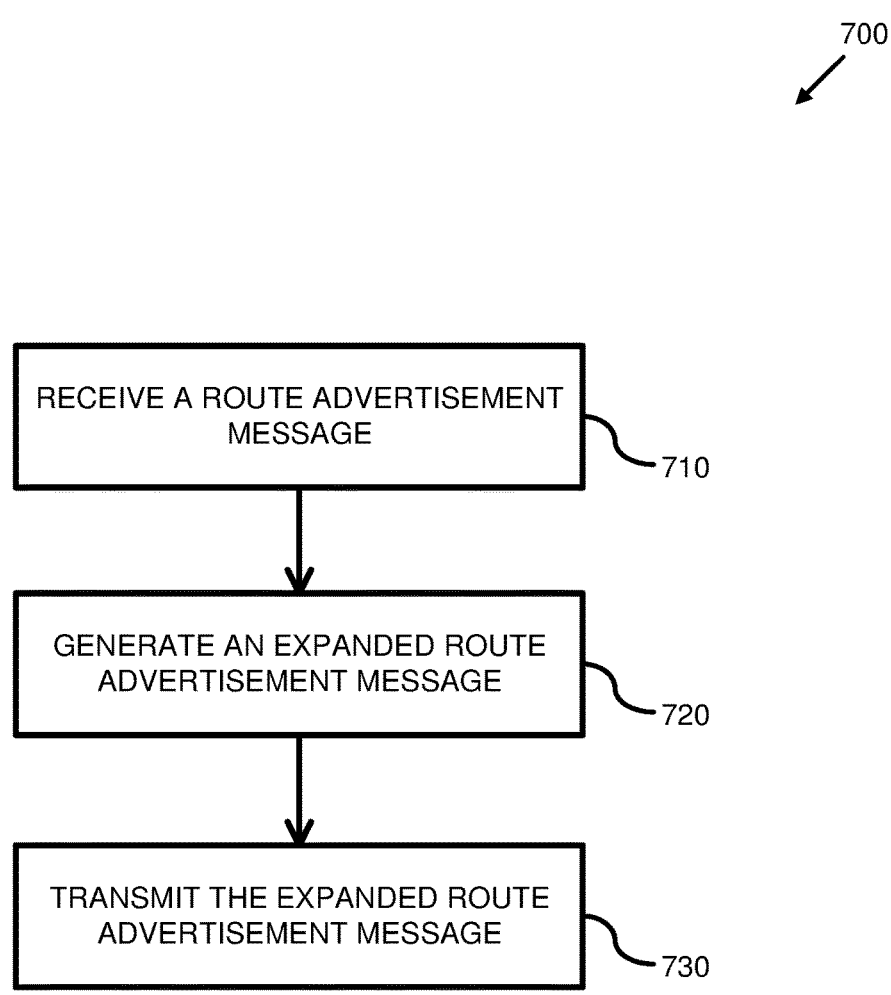
FIG. 7 is a flowchart of an example method for expanding network route advertisements.

FIG. 7 is a flowchart of an example method 700 for expanding network route advertisements. Any of the example systems described herein can be used to perform the example method 700.

At 710, a route advertisement message is received at a route expansion server from a router connected to the route expansion server. The route advertisement message can comprise a route advertisement that indicates that the router is a potential next hop for a given network address prefix. The route advertisement can comprise an identity of the router. For example, the route advertisement message can comprise one or more data fields with which the router connected to the route expansion server can be identified. Such data fields can include a network address of the router (such as an IP address, etc.), a label associated with the router (such as an MPLS label, etc.), an identifier for communication port of the route expansion server to which the router is connected, etc. The network address prefix can be in any standard network address prefix notation (such as CIDR notation, subnet mask notation, etc.). In a particular embodiment, the route advertisement message comprises one or more BGP network layer reachability information (NLRI) UPDATE messages.

At 720, an expanded route advertisement message is generated by the route expansion server based on the identity of the router, wherein the expanded route advertisement message comprises an additional route advertisement for the router. In at least some embodiments, generating the expanded route advertisement message can comprise using the identity of the router to look up the additional route advertisement in a route expansion table. Such a route expansion table can be stored on the route expansion server. Additionally or alternatively, all or part of the route expansion table can be stored in a separate network location that is accessible by the route expansion server. The additional route advertisement can comprise one or more additional network address prefixes. In at least some embodiments, one or more of the additional network address prefixes can identify one or more subnets of the network address prefix received in the route advertisement message 710.

At 730, the expanded route advertisement message is transmitted to another router connected to the route expansion server. The expanded route advertisement message can indicate to the other router that the router is a potential next hop for data packets destined for the one or more additional network address prefixes.

The expanded route advertisement message can conform to a same network routing protocol as the route advertisement message received at 710. For example, in an embodiment where the route advertisement message comprises a BGP NLRI UPDATE message, the expanded route advertisement message can comprise a modified version of the BGP NLRI UPATE message that has been expanded to include the one or more additional network address prefixes. Alternatively, the route advertisement message and the expanded route advertisement message can conform to different routing protocols, wherein one network routing protocol is used to transmit the route advertisement message from the router to the route expansion server and a different network routing protocol is used to transmit the expanded route advertisement message to the other router connected to the route expansion server.

Figure 8:
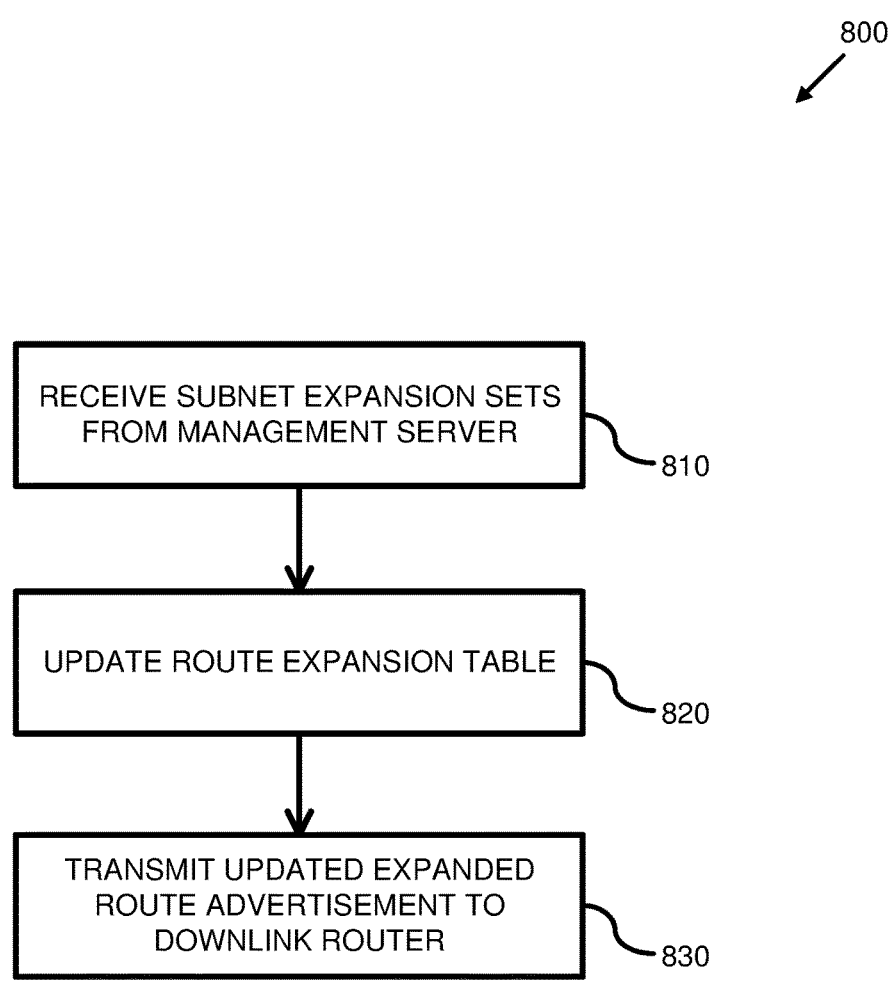
FIG. 8 is a flowchart of an example method for dynamically updating route expansion sets.

FIG. 8 is a flowchart of an example method 800 for dynamically updating route expansion sets. Any of the example systems described herein can be used to perform the example method 800.

At 810, one or more subnet expansion sets are received at a route expansion server. In at least some embodiments, the one or more subnet expansion sets comprise multiple network address prefixes associated with one or more network zone edge routers. The multiple network address prefixes can, in at least some cases, identify one or more subnets of a given network address block. For example, a subnet expansion set can comprise one or more route advertisements comprising the multiple network address prefixes, an identity of the network zone edge router, and an association between the one or more route advertisements in the identity of the network zone edge router.

The one or more subnet expansion sets can be received as part of a route expansion message transmitted by a route expansion management server to the route expansion server via a computer network. The route expansion management server can be connected to the route expansion server via a network management plane comprising one or more computer network connections. Such a network management plane can be separate from a network routing plane with which the route expansion server is configured to receive/transmit route advertisements from/to peer routers connected to the route expansion server.

At 820, a route expansion table is updated using the received one or more route expansion sets. The route expansion table can comprise associations between network zone edge router identifiers and route expansion sets. The route expansion server can be configured to store the one or more network address prefixes contained in the one or more route expansion sets in the route expansion table in association with the network zone edge router identified in the received route expansion message. An identifier for a network zone edge router received as part of the route expansion message at 810 can be used as a key to look up a route expansion set associated with the network zone edge router in the route expansion table. If an expansion set is already associated with the edge router identifier in the route expansion table, then that expansion set can be modified or replaced by a subnet expansion set associated with the edge router that was received at 810. If an expansion set is not associated with the edge router identifier in the route expansion table, then a new entry can be added to the route expansion table that associates the identifier for the edge router with the subnet expansion set received at 810.

In at least some embodiments, the route expansion table can be configured to associate subnet expansion sets with keys that comprise a combination of the edge router identifiers and subnet identifiers. In such an embodiment, the route expansion message received at 810 can comprise an identifier for a network zone edge router and a subnet identifier that, in combination, are associated with a subnet expansion set. The combination of the edge router identifier and the subnet identifier can be used as a key to search the route expansion table. An entry can be added to/updated in the route expansion table to associate the combination of the edge router identifier and the subnet identifier with the subnet expansion set. In such an embodiment, a given network zone edge router can be associated with multiple, different subnet expansion sets that are received at 810, wherein each of the multiple subnet expansion sets are associated with different subnet identifiers.

At 830, one or more updated expanded route advertisements are transmitted to a downlink router connected to the route expansion server. The downlink router can be a peer router connected to the route expansion server that is external to a network zone associated with the network zone edge router identified in the route expansion message received at 810. The updated expanded route advertisement can be transmitted responsive to receipt of a route advertisement from the network zone edge router. The route advertisement can comprise the identifier for the network zone edge router. The route expansion server can extract the edge router identifier from the route advertisement and use the extracted edge router identifier to look up the updated subnet expansion set in the route expansion table. The route expansion server can generate an expanded route advertisement that comprises the one or more network address prefixes in the subnet expansion set and can transmit the expanded route advertisement to the downlink router.

In at least some embodiments, the downlink router can be connected to the network zone edge router via separate data communication plane. Transmitting the updated expanded route advertisement to the downlink router can indicate to the downlink router that the network zone edge router is now a potential next hop for data packets destined for network addresses that start with the one or more network address prefixes in the updated subnet expansion set.

Thus, in at least some cases the example method 800 can be used to dynamically update associations between network zone edge routers and network address prefixes.

Figure 9:
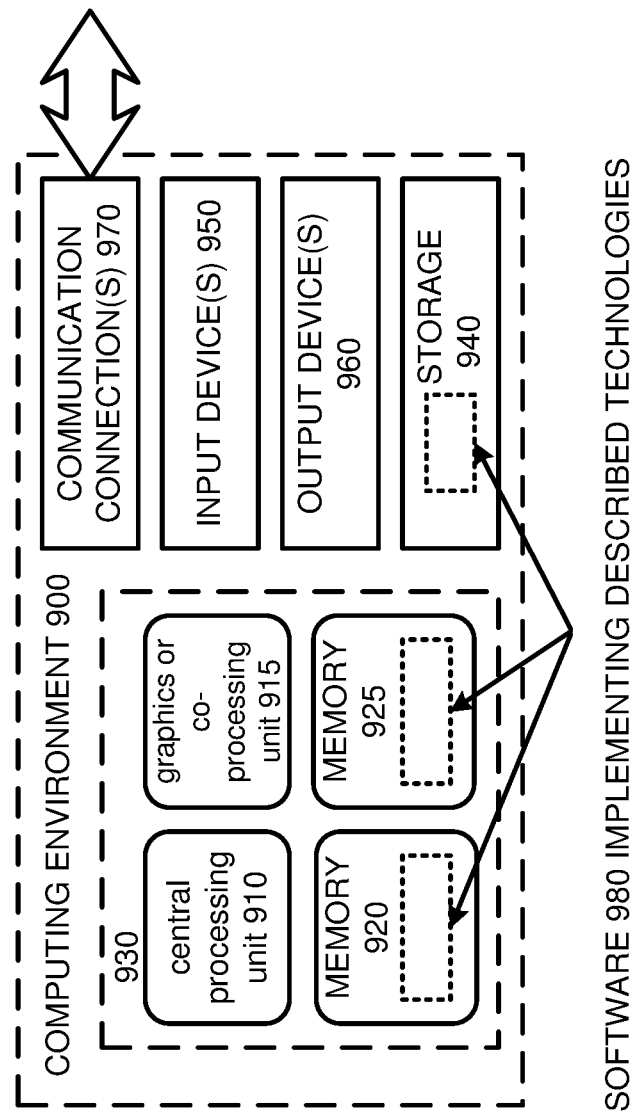
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.). In at least some embodiments, the computing environment 900 can be a router, route expansion server, and/or network route management server as described herein.

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, solid state storage, magnetic tapes or cassettes, CD-ROMs, DVDs, or any other medium which can be used to store information in a non-transitory way and which can be accessed within the computing environment 900. The storage 940 can store instructions for the software 980 implementing one or more innovations described herein.

In at least some embodiments, the storage 940 and/or the memory 920, 925 can be used to store route expansion mappings and/or a route expansion table as described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A system for generating route advertisement messages in a computer network, the system comprising a route expansion server connected to routers in the computer network, wherein the route expansion server is configured to:
- receive a route expansion message via a computer network, wherein the route expansion message comprises an identifier for a network zone edge router and a first network address prefix;
- store the first network address prefix in a route expansion table in association with the network zone edge router;
- receive a network route advertisement message from the network zone edge router via the computer network, wherein the network route advertisement message identifies the network zone edge router as a potential next hop for a second network address prefix;
- retrieve the first network address prefix from the route expansion table;
- generate an expanded network route advertisement message, wherein the expanded network route advertisement message identifies the network zone edge router as a potential next hop for the first network address prefix and additionally identifies the network zone edge router as a potential next hop for the second network address prefix that is identified in the received network route advertisement message; and
- transmit the expanded network route advertisement message to another router via the computer network.

2. The system of claim 1, further comprising a network route management server, configured to:
- generate the route expansion message; and
- transmit the route expansion message to the route expansion server via the computer network.

3. The system of claim 1, wherein the first network address prefix identifies a network address block that is a subnet of a network address block that is identified by the second network address prefix.

4. The system of claim 1, wherein:
- the computer network is a multiprotocol label switching (MPLS) network;
- the identifier for the network zone edge router is an MPLS label associated with the network zone edge router;
- the network route advertisement message comprises the MPLS label associated with the network zone edge router; and
- the retrieving the first network address prefix from the route expansion table comprises using the MPLS label associated with the network zone edge router to look up the first network address prefix in the route expansion table.

5. The system of claim 1, wherein:
- the network zone edge router is a first network zone edge router for a first network zone, and the network route advertisement message is a first network route advertisement message;
- the route expansion message further comprises an identifier for a second network zone edge router for a second network zone and a third network address prefix; and
- the route expansion server is further configured to:
  - store the third network address prefix in the route expansion table in association with the second network zone edge router,
  - receive a second network route advertisement message from the second network zone edge router, wherein the second network route advertisement message identifies the second network zone edge router as a potential next hop for the second network address prefix,
  - retrieve the third network address prefix from the route expansion table,
  - generate another expanded network route advertisement message, wherein the another expanded network route advertisement message identifies the second network zone edge router as a potential next hop for the second network address prefix and the third network address prefix, and
  - transmit the another expanded network route advertisement message to the another router via the computer network.

6. The system of claim 1, wherein:
- the route expansion message comprises multiple network address prefixes, including the first network address prefix; and
- the route expansion server is further configured to:
  - store the multiple network address prefixes in the route expansion table in association with the network zone edge router, and
  - retrieve the multiple network address prefixes from the route expansion table;
- wherein the expanded network route advertisement message identifies the network zone edge router as a potential next hop for each of the multiple network address prefixes.

7. A method, comprising:
- receiving a route advertisement message at a route expansion server from a router connected to the route expansion server, wherein the route advertisement message comprises a route advertisement for the router, wherein the route advertisement identifies the router as a potential next hop for a first network subdomain;
- generating an expanded route advertisement message by the route expansion server based on an identity of the router, wherein the expanded route advertisement message comprises the route advertisement for the router in the received route advertisement message and an additional route advertisement for the router, wherein the additional route advertisement identifies the router as a potential next hop for a second network subdomain; and
- transmitting the expanded route advertisement message to another router connected to the route expansion server.

8. The method of claim 7, wherein the generating the expanded route advertisement message comprises:
- using the identity of the router to look up the additional route advertisement in a route expansion table stored on the route expansion server.

9. The method of claim 8, further comprising:
- receiving a subnet expansion set at the route expansion server, wherein the subnet expansion set comprises the additional route advertisement, the identity of the router, and an association between the additional route advertisement and the identity of the router; and
- updating the route expansion table to include a mapping between the identity of the router and the additional route advertisement.

10. The method of claim 9, wherein the subnet expansion set is received from a network management server via a network management plane.

11. The method of claim 7, wherein:
- the router is an edge router for a border gateway protocol autonomous system; and
- the additional route advertisement comprises a network layer reachability information update message that identifies the router as a next hop for the second network subdomain.

12. The method of claim 7, wherein the identity of the router comprises a label received from the router as part of the route advertisement message.

13. The method of claim 7, wherein:
the route advertisement message received from the router comprises a route advertisement associating the router with a fake domain prefix; and
the generating the expanded route advertisement message comprises replacing the route advertisement associating the router with the fake domain prefix with:
a new route advertisement associating the router with a valid domain prefix, and
the additional route advertisement.

14. The method of claim 13, wherein the second network subdomain is a subdomain of a network domain associated with the valid domain prefix.

15. A computing device comprising a processor and a computer-readable storage medium storing executable instructions that, when executed by the processor, cause the computing device to perform operations, the operations comprising:
receiving a route advertisement from an edge router for a network zone, wherein the route advertisement comprises an identifier for the edge router and a subnet identifier and identifies the edge router as a potential next hop for a first network subdomain that is associated with the subnet identifier;
determining an additional subnet identifier associated with the edge router using the identifier for the edge router;
generating an expanded route advertisement message, wherein the expanded route advertisement message identifies the edge router as a potential next hop for the first network subdomain that is associated with the subnet identifier in the received route advertisement and additionally identifies the edge router as a potential next hop for a second network subdomain that is associated with the additional subnet identifier; and
transmitting the expanded route advertisement message to a router outside the network zone.

16. The computing device of claim 15, wherein:
the computing device further comprises a route expansion table comprising route expansion records; and
the determining the additional subnet identifier comprises searching the route expansion table for a route expansion record associated with the identifier for the edge router, and retrieving the additional subnet identifier from the route expansion record associated with the identifier for the edge router.

17. The computing device of claim 16, wherein:
the route expansion records are associated with keys comprising router identifiers and subnet identifiers; and
the searching the route expansion table comprises using the identifier for the edge router and the subnet identifier as a key to locate the route expansion record.

18. The computing device of claim 15, wherein:
the first network subdomain comprises an aggregate subnet; and
the second network subdomain comprises a subnet within the aggregate subnet.

19. The computing device of claim 15, wherein the operations further comprise:
receiving a second route advertisement, wherein the second route advertisement is received from a different edge router for a different network zone, wherein the second route advertisement comprises an identifier for the different edge router and the subnet identifier and identifies the different edge router as a potential next hop for the first network subdomain that is associated with the subnet identifier;
determining a different additional subnet identifier associated with the different edge router using the identifier for the different edge router;
generating another expanded route advertisement message, wherein the another expanded route advertisement message identifies the different edge router as a potential next hop for the first network subdomain that is associated with the subnet identifier and identifies the different edge router as a potential next hop for a third network subdomain that is associated with the different additional subnet identifier; and
transmitting the another expanded route advertisement message to the router outside the network zone, wherein the router outside the network zone is also outside the different network zone.

20. The computing device of claim 15, wherein the identifier for the edge router received as part of the route advertisement comprises an attribute associated with a border gateway protocol community.

* * * * *